United States Patent Office.

HORACE H. HANMER, OF NASHVILLE, TENNESSEE.

Letters Patent No. 109,203, dated November 15, 1870.

IMPROVEMENT IN HORSE AND CATTLE LINIMENTS.

The Schedule referred to in these Letters Patent and making part of the same.

I, HORACE H. HANMER, of Nashville, in the State of Tennessee, have invented a certain compound called "Hanmer's Celebrated Horse and Cattle Liniment."

The nature of my invention consists in the combination of certain ingredients, in the proportions herein mentioned, making a liniment for the cure of rheumatism, lameness, sprains, bruises, &c.

To prepare this liniment, use the following ingredients, and in the proportions set forth, as follows, to wit:

Sweet oil, twenty-four ounces; spirits of camphor, twelve ounces; aqua ammonia, twelve ounces; laudanum, six ounces; oil of origanum, three ounces; oil of sassafras, three ounces; oil of cedar, one-half ounce.

These ingredients, in the proportions named, to be well mixed together, and used externally.

Claim.

What I claim as my invention is—

The manufacture or preparation of a compound, which is denominated "Hanmer's celebrated horse and cattle liniment," of the ingredients, in the proportions and for the purposes set forth.

H. H. HANMER.

Witnesses:
  C. H. EASTMAN,
  M. HAMILTON.